United States Patent [19]
Holbury et al.

[11] Patent Number: 5,002,244
[45] Date of Patent: Mar. 26, 1991

[54] FUEL SYSTEM ORGANIZER FOR AUTOMOTIVE VEHICLES

[75] Inventors: Walter E. Holbury, Algonac; Michael J. Solocinski, Sterling Heights, both of Mich.

[73] Assignee: Huron Products Corporation, Mt. Clemens, Mich.

[21] Appl. No.: 272,087

[22] Filed: Nov. 16, 1988

[51] Int. Cl.$^5$ ............................................. F16M 13/00
[52] U.S. Cl. .................................... 248/68.1; 248/74.2
[58] Field of Search .................... 248/68.1, 74.2, 74.5, 248/65, 58; 280/762, 769

[56] References Cited

U.S. PATENT DOCUMENTS

| | | |
|---|---|---|
| 800,054 | 9/1905 | Ayres . |
| 1,189,208 | 6/1916 | Hodkinson . |
| 1,995,370 | 3/1935 | Walters . |
| 2,087,640 | 7/1937 | Lefebvre Du Prey . |
| 2,938,692 | 5/1960 | Bosworth et al. . |
| 3,188,030 | 6/1965 | Fischer . |
| 3,295,806 | 1/1967 | Modeme . |
| 3,325,128 | 6/1967 | Elleboudt . |
| 3,387,343 | 6/1968 | Fitzgerald ...................... 248/68.1 X |
| 3,432,128 | 3/1969 | Elleboudt . |
| 3,721,762 | 3/1973 | Gooding . |
| 3,809,799 | 5/1974 | Taylor . |
| 3,894,706 | 7/1975 | Mizusawa ...................... 248/74.2 X |
| 3,909,505 | 9/1975 | Taylor . |
| 4,180,022 | 12/1979 | Khair et al. .......................... 123/472 |
| 4,234,012 | 11/1980 | Schupback ...................... 248/68.1 X |
| 4,244,544 | 1/1981 | Kornat ............................... 248/68.1 |
| 4,589,449 | 5/1986 | Bramwell . |
| 4,602,124 | 7/1986 | Santucci . |
| 4,705,244 | 11/1987 | Saotome et al. ................... 248/68.1 |

FOREIGN PATENT DOCUMENTS

| | | | |
|---|---|---|---|
| 2908120 | 9/1980 | Fed. Rep. of Germany ..... | 248/68.1 |
| 0044084 | 3/1980 | Japan .................................. | 248/68.1 |

*Primary Examiner*—Karen J. Chotkowski
*Attorney, Agent, or Firm*—Harness, Dickey & Pierce

[57] ABSTRACT

A fuel line organizer has a frame, mechanism for coupling one or more fuel related lines to the frame and a mechanism for enabling coupling of the frame to the underside of a vehicle body. The organizer is adapted to receive fuel lines to provide a one piece fuel rail from a supply tank to a fuel injector system.

7 Claims, 1 Drawing Sheet

FUEL SYSTEM ORGANIZER FOR AUTOMOTIVE VEHICLES

BACKGROUND AND SUMMARY OF THE INVENTION

The present invention relates to fuel lines and, more particularly, to an apparatus which organizes and protects fuel lines on an automotive vehicle.

In the automotive industry, fuel injection systems are supplied by a plurality of lines. Generally, the systems require at least three fuel related lines. These lines must be routed from the gasoline supply tank underneath the vehicle to the fuel injector system. The lines supply and return fuel as well as vent the system. To maintain an aesthetic appearance and also to protect the lines, several engineering considerations must be evaluated before the fuel lines can be routed and positioned underneath the vehicle.

The automotive industry has utilized various types of devices to maintain the fuel lines underneath the vehicle. One such device is clips or the like which support the fuel lines at given intervals along its course underneath the vehicle. Also, the industry has provided cover stock sleeves which are positioned around the fuel lines for protection. The cover stock sleeves are positioned peripherally about each of the fuel lines. While the cover stock sleeves provide protection, they add additional cost and bulkiness to the system.

The present invention provides the art with a fuel line organizer that enhances the appearance of the underside of a vehicle. The present invention provides the art with a unitary organizer which enables fuel lines to be mechanically fitted therein by a snap or friction fit. Also, the present invention provides the art with a device that conceals the fuel lines to protect them against road hazards or the like.

From the following detailed description and appended claims taken in conjunction with the drawings, other objects and advantages of the present invention will become apparent to those skilled in the art.

DETAILED DESCRIPTION OF A PREFERRED EMBODIMENT

Figure 1:
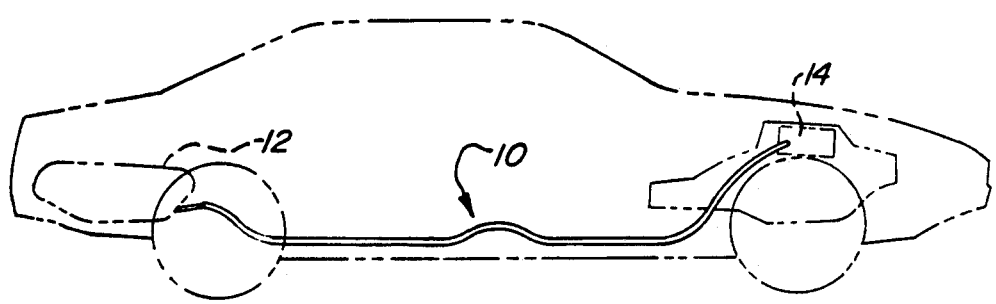
FIG. 1 is a side elevation view of a fuel line organizer in accordance with the present invention secured to a vehicle shown in phantom.
Figure 2:
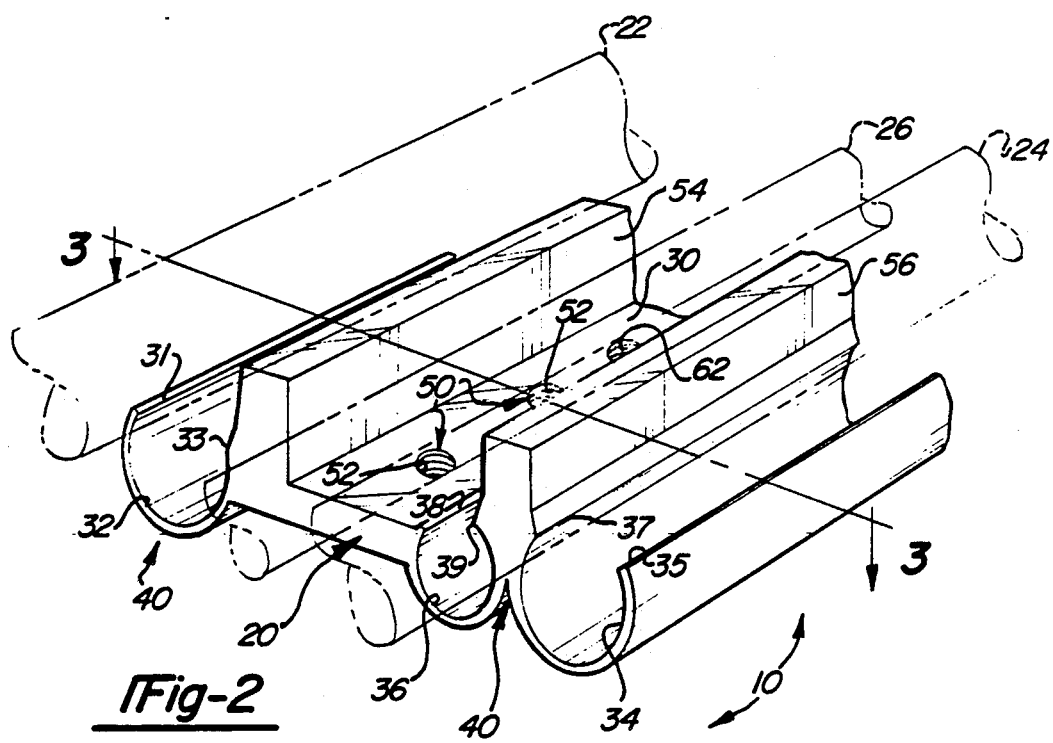
FIG. 2 is a partial perspective view of the fuel line organizer in accordance with the present invention.

Turning to the figures, particularly FIG. 1, a fuel line organizer assembly is illustrated and designated with the reference numeral 10. The fuel line organizer assembly 10 is adapted to be coupled with a fuel source such as a gasoline tank 12 and with a fuel injection system 14 of a vehicle engine.

The fuel organizer assembly 10 includes a rail 20 and one or more fuel lines 22, 24 and 26. The fuel lines 22, 24 and 26 represent a fuel supply line, a fuel return line, and a vent line. Fuel lines 22, 24 and 26 may be formed from elastomeric or metallic materials. The diameters of the lines 22, 24 and 26 may vary according to the desired specifications. The fuel lines 22, 24 and 26 have fittings on each end for coupling them with the fuel tank 12 and injector system 14.

The fuel rail 20 is formed from a polymeric material. Generally, the rail 20 is extruded from an extrusion machine. The fuel rail 20 generally includes a frame 30, a mechanism to enable coupling of the fuel lines with the frame 40, and members 50 to enable securement of the rail 20 to the underside of the vehicle. Generally, the frame 30, coupling mechanism 40 and securement member 50 are integrally formed as an extruded unitary construction.

The frame 30 is generally elongated having a desired length and thickness. The frame 30 may be formed in any desired configuration to enable the frame 30 to follow the contour of the underside of the vehicle body (See FIG. 1). The frame 30 includes the securement member 50. Generally, the securement member 50 is a series of apertures 52 formed through the frame 30. Screws, bolts, clips, rivets or the like are used to secure the frame 30 through the apertures 52 to the underside of the vehicle body.

Figure 3:
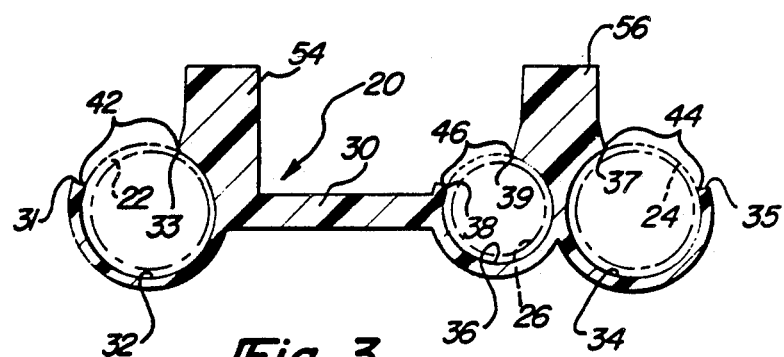
FIG. 3 is a vertical cross-section view through a plane defined by lines 3—3 of FIG. 2.

The mechanism 40 for coupling the fuel lines, is generally comprised of one or more arcuate receivers 32, 34 and 36. The arcuate receivers 32, 34 and 36 enable fuel lines 22, 24 and 26 to be secured therein. The arcuate receivers 32, 34 and 36 generally surround about three quarters of the periphery of the fuel line as seen in FIG. 3. The arcuate receivers 32, 34 and 36 are open at their top to enable the fuel lines 22, 24 and 26 to be positioned into the receiver. The side edges 31 and 33, 35 and 37, and 38 and 39 defining the openings 42, 44 and 46 of the arcuate receivers 32, 34 and 36 are resiliently biased away from one another such that the fuel lines may be positioned into the receivers 32, 34 and 36. This mechanical retention substantially surrounds the fuel lines such that when the rail 20 is positioned onto the underside of a vehicle, the fuel lines 22, 24 and 26 are concealed from road hazards or the like by the receivers 32, 34 and 36 and frame 30 of the rail 20.

The receivers 32, 34 and 36 may have diameters of varying size to accommodate different size diameter fuel lines. Generally, the receiver 32 is on one side of the frame 30 and the receivers 34 and 36 are on the other side of the frame 30. Receivers 34 and 36 abut one another and share a common wall.

The frame 30 also includes a pair of members 54 and 56. The members provide proper spacing between the vehicle underside and the fuel lines 22, 24 and 26 when the rail 20 is positioned onto the vehicle. Also, the members 54 and 56 enhance the biasing of the side edges apart from one another.

The rail 20 is generally extruded from a die or the like from a T.P.E. based resin material. Each of the fuel lines 22, 24 and 26 are positioned mechanically into their respective positions in the receivers 32, 34 and 36. The rail 20 with the fuel lines 22, 24 and 26 assembled, is inserted into a forming fixture. The fixture is heated to a temperature of about 300° F. for about 15 minutes. After this period of time, the rail 20 is formed into a desired configuration. The form assembly is further allowed to cool to ambient temperature. After the cooling period, the rail 20 with the fuel lines 22, 24 and 26 in place is removed from the fixture. The end fittings which connect the fuel lines to the supply tank 12 and injector system 14 are positioned on each end of the fuel lines 22, 24 and 26. Thus, the fuel line organizer 10 is ready to be secured to the underbody, supply tank and injection system of an automotive vehicle.

While the above detailed description fulfills the preferred embodiment of the present invention, it will be understood that the present invention is susceptible to variation, modification, and alteration without varying from the scope and fair meaning of the subjoined claims.

What is claimed is:

1. A fuel line organizer comprising:
    a frame member, said frame member having a desired length and configuration enabling said frame to follow a contour of a vehicle underbody such that said frame member continuously extending from a vehicle fuel tank to a vechicle injector system concealing and protecting fuel related lines from external forces when said organizer is secured to the underbody of the vehicle;
    arcuate receiver means for coupling one or more fuel related lines to said frame member, said arcuate receiver means being unitary, continuous and running axially with said frame member; and
    means for enabling securing of said frame member to a vehicle underbody.

2. The fuel organizer according to claim 1 wherein said arcuate receiver means is further comprised of one or more arcuate receivers for receiving and securing one or more fuel related lines on said frame member.

3. The fuel organizer according to claim 2 wherein said one or more arcuate receivers are adapted to receive the same or different size diameter fuel related lines.

4. The fuel organizer according to claim 1 wherein said organizer is one piece and formed from a polymeric material.

5. A fuel line organizer assembly comprising:
    a frame member, said frame member having a desired length and configuration adapted to enable said frame to follow a contour of a vehicle underbody such that said frame member continuously extending from a vehicle fuel tank to a vechicle injector system concealing and protecting fuel related lines from external forces when said organizer is secured to the vehicle underbody;
    arcuate receiver means for coupling one or more fuel related lines to said frame member, said arcuate receiver means being unitary, continuous and running axially with said frame member;
    one or more fuel related lines coupled with said arcuate receiver means on said frame;
    means for coupling said one or more fuel related lines with a fuel source, said coupling means associated with said one or more fuel related lines;
    means for coupling said one or more fuel related lines with a fuel injection system, said coupling means associated with said one or more fuel related lines; and
    means for securing said frame member to a vehicle underbody.

6. The assembly according to claim 5 wherein said arcuate receiver means is further comprised of one ore more arcuate receivers for receiving and retaining one or more fuel related lines on said frame member.

7. The assembly according to claim 5 wherein said frame member is elongated and includes bends, discontinues or the like to enable said frame member to conform to the contour of a vehicle underside.

* * * * *

UNITED STATES PATENT AND TRADEMARK OFFICE
CERTIFICATE OF CORRECTION

PATENT NO. : 5,002,244

DATED : Mar. 26, 1991

INVENTOR(S) : Walter E. Holbury et al

It is certified that error appears in the above-identified patent and that said Letters Patent is hereby corrected as shown below:

Col. 3, Line 12, Claim 1, "vechicle" should be --vehicle--;

Col. 4, Line 6, Claim 5, "vechicle" should be --vehicle--;

Col. 4, Line 26, Claim 6, "ore" should be --or--;

Col. 4, Lines 30-31, Claim 7, "discontinues" should be --discontinuities--.

Signed and Sealed this

Eighth Day of December, 1992

Attest:

DOUGLAS B. COMER

*Attesting Officer*  *Acting Commissioner of Patents and Trademarks*